United States Patent Office 3,647,920
Patented Mar. 7, 1972

3,647,920
POLYETHYLENE AS A LUBRICANT FOR POLY-
IMIDES OF 3,4-DICARBOXY - 1,2,3,4-TETRAHY-
DRO - 1 - NAPTHALENE SUCCINIC DIANHY-
DRIDE AND A DIAMINE
Roland Ralph Di Leone, Rowayton, Conn., assignor to
American Cyanamid Company, Stamford, Conn.
No Drawing. Filed Oct. 27, 1970, Ser. No. 84,455
Int. Cl. C08g 41/04
U.S. Cl. 260—851 PI                                 10 Claims

ABSTRACT OF THE DISCLOSURE

A composition of matter comprising a thermoplastic polyimide of 3,4-dicarboxy-1,2,3,4-tetrahydro-1-naphthalene succinic dianhydride and a diprimary diamine containing small quantities of thermoplastic polyethylenes.

CROSS REFERENCES TO RELATED APPLICATIONS

This application is related to the instant Applicant's copending application Ser. No. 589,521, now abandoned, filed Oct. 26, 1966 (Attorney's Docket 21,749) in that said application is directed to the polyimides of 3,4-dicarboxy-1,2,3,4-tetrahydro-1-naphthalene succinic dianhydride and a diprimary diamine. Said application is incorporated herein by reference. This application is related to the instant Applicant's copending application Ser. No. 734,579, filed June 5, 1968, now Pat. No. 3,565,-847 (Attroney's Docket 22,588) in that it covers these polyimides plasticized with certain triaryl phosphates and is incorporated herein by reference. This application is related to the copending application of Nelson Hsu, Ser. No. 688,675, filed Dec. 7, 1967, now Pat. No. 3,574,160 (Attorney's Docket 22,005) which is also incorporated herein by reference.

BACKGROUND OF THE INVENTION

Thermoplastic polyimides had been prepared according to the prior art by reacting one or more dianhydrides of tetra-carboxylic acids with a diprimary diamine. The polyimides of the prior art have been used for a plurality of purposes depending on their physical properties and some of them can be used to make extrusion moldings and injection moldings. For these latter purposes some of the high molecular weight thermoplastic polyimides are not easily molded by extrusion and injection and require the presence in the polyimide of certain quantities of a plasticizer or a lubricant in order to facilitate the molding. By including a plasticizer and/or lubricant into the composition, fabrication of the molded article is rendered much easier. However, not all plasticizers are suitable for all purposes and a plasticizer which is useful for one category of polyimides may be virtually worthless for other polyimides.

FIELD OF THE INVENTION

This invention is in the field of thermoplastic polyimides prepared by reacting a dianhydride of certain tetracarboxylic acids and a diprimary diamine to produce such a polyimide which has incorporated therein physically small quantities of thermoplastic polyethylenes in order to provide lubricity to the polyimide composition.

DESCRIPTION OF THE PRIOR ART

The instant applicant is aware of the following U.S. patents which are deemed to be representative of the prior art in the field of thermoplastic polyimides; U.S. 3,373,-171; 3,410,876; 3,472,875; 3,489,725; 3,501,443. In order to avoid unnecessary redundancy all of these patents are incorporated herein by reference.

SUMMARY OF THE INVENTION

This invention relates to thermoplastic polyimide compositions derived by reacting a 3,4-dicarboxy-1,2,3,4-tetrahydro-1-naphthalene succinic dianhydride with a diprimary diamine in the presence of a solvent and incorporating into said polyimide solution thermoplastic polyethylenes in amounts varying between about 0.1% and 5% by weight based on the total weight of the polyimide and preferably in amounts varying between about 0.5% and 1% by weight same basis. In my U.S. Pat. 3,501,443 referred to hereinabove it is indicated that the preferred solvents used in preparing the compositions of the present invention are selected from the group consisting of acetophenone, cyclohexanone, isophorone, propionphenone and benzophenone. The thermoplastic polyethylenes may be introduced into the solvent medium before, during and after the imidization reaction and, after the water of imidization has been removed, the organic solvent is removed leaving the neat thermoplastic polyimide with the thermoplastic polyethylene dispersed throughout the polyimide thereby providing lubricity to the polyimide composition. In removing the solvent, the conventional techniques such as vacuum distillation or devolatilization and extrusion may be used. The resultant neat polyimide being a thermoplastic material may be chopped up into granules of any selected size so as to be readily useful as a molding composition.

The thermoplastic polyethylenes used in the composition of the present invention are available in a variety of forms and molecular weights from a plurality of commercial sources. Some of these polyethylenes are of a comparatively low molecular weight such as about 1500 to about 5000 and are described as being waxes. Others having a molecular weight of 100,000 to about 1,000,000 can be used in the composition of the present invention. These thermoplastic polyethylenes also come in a range of densities from low to medium to high. The low density thermoplastic polyethylenes have a density of about .81 whereas the medium density thermoplastic polyethylenes have densities between about .88, .91, and .93. The high density thermoplastic polyethylenes had densities of about .98 or .99. The Brookfield viscosities of these thermoplastic polyethylenes vary over a wide range and are generally measured in a melt at 140° C. The Brookfield viscosities vary between about 40 centipoises and 9000 centipoises and preferably those that have a Brookfield viscosity between about 145 centipoises and 350 centipoises. Due to the lubricity of these thermoplastic polyethylenes, the addition of the same to the polyimides of the present invention makes the processing easier. These thermoplastic polyethylenes generally have a softening point between about 102° C. and 109° C.

In preparing the polyimides of the present invention one may utilize a 3,4-dicarboxy-1,2,3,4-tetrahydro-1-naphthalene succinic dianhydride which is referred to hereinbelow as tetralin dianhydride for simplicity and sometimes as TDA for brevity. These dianhydrides will be referred to as TDA per se when the actual compound 3,4 - dicarboxy-1,2,3,4-tetrahydro-1-naphthalene succinic dianhydride is used and as alkyl substituted TDA when the TDA is substituted in the 6 or 7 position with an alkyl group containing from 1 to 7 carbon atoms. It is preferred that a TDA be used as the sole dianhydride in reaction with the diprimary diamine to produce the most desirable polyimides of the present invention. However, other dianhydrides may be used with the TDA in coreaction with the diprimary diamine but there should be at least 10 mol percent of the TDA present based on the total mols of dianhydrides used to prepare the polyimides. Among the other non-TDA dianhydrides which may be used in the practice of the process of the present invention are the following:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
ethylene tetracarboxylic dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenonthrene-1,8,9,10-tetracarboxylic dianhydride;
cyclopentane-1,2,3,4-tetracarboxylic dianhydride;
pyrrolidine-2,3,4,5-tetracarboxylic dianhydride;
pyrazine-2,3,5,6-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4-tetracarboxylic dianhydride;
1,2,3,4-butane tetracarboxylic dianhydride;
thiophene-2,3,4,5-tetracarboxylic dianhydride;

and the like and mixtures thereof.

The second essential component used in the process of the present invention is a diprimary diamine having the structural formula:

$$H_2N-R-NH_2$$

in which R is a divalent organic radical. Among the specific diprimary diamines which may be used in the practice of the process of the present invention are:

meta-phenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis-(4-amino-phenyl)phosphine oxide;
bis-(4-amino-phenyl)-N-methylamine;
1,5-diamino naphthalene;
3,3'-dimethyl-4,4'-diamino-diphenyl;
3,3'-dimethoxybenzidine;
2,4-bis(beta-amino-t-butyl)toluene;
bis-(para-beta-amino-t-butyl-phenyl)ether;
para-bis(2-methyl-4-amino-pentyl)benzene;
para-bis-(1,1-dimethyl-5-amino-pentyl)benzene;
m-xylylene diamine;
p-xylylene diamine;
bis(para-amino-cyclohexyl)methane;
hexamethylene diamine;
heptamethylene diamine;
octamethylene diamine;
nonamethylene diamine;
decamethylene diamine;
3-methyl-heptamethylene diamine;
4,4'-dimethylheptamethylene diamine;
2,11-diamino-dodecane;
1,2-bis-(3-amino-propoxy)ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
2,5-diamino-1,3,4-oxa-diazole;
$H_2N(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$;
and mixtures thereof.

In reacting the TDA with the diprimary diamine whether alone or in admixture with other dianhydrides or other diprimary diamines the total number of mols of the dianhydride should be substantially the same as the total number of mols of the diprimary diamine. In other words, the dianhydrides and the diamines are used on a 1:1 mol basis. Slight departures from this mol ratio can be utilized by using a slight excess such as about 5-10 mol percent of either the dianhydride or the diamine. The amount of solvent used in carrying out the process of the present invention may be between about 30% and 99% by weight of solvent based on the total weight of said solution. Preferably depending on the ultimate use of product, one would use between about 30% and 70%.

In order that the concept of the present invention may be more completely understood, the following examples are set forth in which all parts are parts by weight unless otherwise indicated. These examples are set forth primarily for the purpose of illustration.

EXAMPLE 1

Into a heavy duty sigma mixer there is introduced 1562 parts of TDA, 1410 parts of acetophenone, 78 parts of pyridine (catalyst) and 24 parts (1.0%) of a commercially available polyethylene having a density of 0.92 and medium molecular weight. The mixture is heated to 70° C. at which time 1034 parts of 4,4'-diaminodiphenyl-methane are added. This mixture is then allowed to react for approximately 3 hours or until all of the theoretical water has been obtained (187 parts of water). At this point 85 parts of tricresyl phosphate and 11 parts of tetrahydrofurfuryl oleate are added as plasticizers. The polymer is then separated from the solvent by devolatilization-extrusion. The purpose of the polyethylene is to reduce the energy necessary for extrusion. For example, without polyethylene the torque generated by the polymer during devolatilization-extrusion is 50-55 on the torque meter, whereas with the polyethylene the torque is reduced to 35-40. One of the unexpected results was the improvement in properties when polyethylene was added. The reason for property improvement is attributed to less damage to the polymer as measured by the lower torque during devolatilization-extrusion. The following table of properties of the polymer with and without polyethylene will illustrate the property improvement:

TABLE I

| | Without PE | With 1% PE |
|---|---|---|
| Tensile strength, p.s.i. | 10,000 | 15,000 |
| Percent elongation | 2.3 | 7.0 |
| Flexural strength, p.s.i. | 18,000 | 24,000 |
| Flexural modulus, p.s.i. | 500,000 | 490,000 |
| Impact strength notched, ft. lb./in. | 0.5 | 1.0 |

A variety of polyethylene materials work in a comparable manner.

EXAMPLE 2

Example 1 was repeated in all essential details except that there was used in the place of the polyethylene used therein, a different polyethylene was used having a density of 0.96 and a high molecular weight. The product had the following properties:

Tensile str.—16,400 p.s.i.
Percent elongation—6.7
Flexural str.—23,800 p.s.i.
Flexural mod.—490,000 p.s.i.

EXAMPLE 3

Example 1 was repeated in all essential details except in the place of the polyethylene used therein there was used a comparable amount of a commercially available polyethylene having a density of 0.940 and a very low molecular weight. The product had the following properties:

Tensile str.—17,000 p.s.i.
Percent elongation—7.0
Flexural str.—24,400 p.s.i.
Flexural mod.—492,000 p.s.i.

EXAMPLE 4

Another commercially available polyethylene having a density of 0.939 and a very low molecular weight was used in the place of the polyethylene of Example 1. The product had the following properties.

Tensile str.—14,500 p.s.i.
Percent elongation—5.2
Flexural str.—24,000 p.s.i.
Flexural mod.—490,000 p.s.i.

EXAMPLE 5

Another commercially available polyethylene material was used having a density of 0.927 and a very low molecular weight in the place of the polyethylene used in Example 1 in a repeat of said example and comparable results were achieved as in Examples 3 and 4.

EXAMPLE 6

Example 1 was repeated again in all essential details except in the place of the polyethylene used in Example 1 a different commercially available polyethylene was used having a density of 0.937 and a very low molecular weight and results comparable to those found in Examples 3 and 4 were achieved.

EXAMPLE 7

Example 1 is repeated in all essential details except in the place of the polyethylene of Example 1 there was used a different commercially available polyethylene having a density of 0.93 and a medium molecular weight. Results comparable to those found in Examples 3 and 4 were achieved.

EXAMPLE 8

Example 1 was repeated in all essential details except in the place of the polyethylene used in Example 1 there was used a commercially available polyethylene having a density of 0.93 and a medium molecular weight. Results comparable to those found in Examples 3 and 4 were achieved.

EXAMPLE 9

Example 1 was again repeated in all essential details except in the place of the polyethylene used in Example 1 there was used a different commercially available polyethylene having a density of 0.91 and a medium molecular weight. Results comparable to those found in Examples 3 and 4 were achieved.

EXAMPLE 10

Example 1 was again repeated in all essential details except that in the place of the polyethylene of Example 1 there was used a different commercially available polyethylene having a density of 0.915 and a medium molecular weight. Results comparable to those found in Examples 3 and 4 were achieved.

EXAMPLE 11

Example 1 was repeated in all essential details except that in the place of the polyethylene of Example 1 there was used a different commercially available polyethylene having a density of 0.924 and a medium molecular weight. Results comparable to those found in Examples 3 and 4 were achieved.

EXAMPLE 12

Example 1 was repeated in all essential details using the polyethylene of Example 1 except that the quantity of the polyethylene was only 0.5% by weight based on the total weight of the polyimide. The product had the following properties.

Tensile str.—13,500 p.s.i.
Percent elongation—6.0
Flexural str.—22,000 p.s.i.
Flexural mod.—480,000 p.s.i.

EXAMPLE 13

Example 1 was repeated in all essential details except that the tricresyl phosphate and the tetrahydrofurfuryl oleate were omitted. The product had the following properties:

Tensile str.—10,500 p.s.i.
Percent elongation—3.2
Flexural str.—18,800 p.s.i.
Flexural mod.—490,000 p.s.i.

I claim:
1. A composition of matter comprising the thermoplastic polyimide of 3,4-dicarboxy-1,2,3,4-tetrahydro-1-naphthalene succinic dianhydride and a diprimary diamine containing from about 0.1 to about 5% by weight based on the weight of the polyimide of a thermoplastic polyethylene.
2. The composition according to claim 1 in which the thermoplastic polyethylene is present in an amount varying between about 0.5% and 1.0%.
3. The composition according to claim 1 in which the thermoplastic polyethylene is a low density thermoplastic polyethylene.
4. The composition according to claim 1 in which the thermoplastic polyethylene is a medium density thermoplastic polyethylene.
5. The composition according to claim 1 in which the thermoplastic polyethylene is a high density thermoplastic polyethylene.
6. The composition according to claim 1 in which the diprimary diamine is an aromatic diprimary diamine.
7. The composition according to claim 6 in which the aromatic diprimary diamine is 4,4'-diaminodiphenyl methane.
8. The composition according to claim 6 in which the aromatic diprimary diamine is meta-phenylene diamine.
9. The composition according to claim 6 in which the aromatic diprimary diamine is para-phenylene diamine.
10. The composition according to claim 6 in which the thermoplastic polyethylene is present in an amount varying between about 0.5% and 1%.

References Cited
UNITED STATES PATENTS

| | | | |
|---|---|---|---|
| 3,005,795 | 10/1961 | Busse | 260—857 |
| 3,356,759 | 12/1967 | Gerow | 260—857 |
| 3,391,221 | 7/1968 | Gore | 260—857 |
| 3,562,214 | 2/1971 | Kubens | 260—28 |
| 3,574,160 | 4/1971 | Hsu | 260—45.8 |

PAUL LIEBERMAN, Primary Examiner

U.S. Cl. X.R.

260—28, 28.5 R, 78 TF, 857 L

Case 23,812

UNITED STATES PATENT OFFICE
CERTIFICATE OF CORRECTION

Patent No. 3,647,920     Dated March 7, 1972

Inventor(s) ROLAND RALPH DI LEONE

It is certified that error appears in the above-identified patent and that said Letters Patent are hereby corrected as shown below:

Column 3 line 26, "phenonthrene" should read -- phenanthrene --.

Signed and sealed this 13th day of June 1972.

(SEAL)
Attest:

EDWARD M. FLETCHER, JR.
Attesting Officer

ROBERT GOTTSCHALK
Commissioner of Patents